US012121938B2

(12) United States Patent
Manko

(10) Patent No.: US 12,121,938 B2
(45) Date of Patent: Oct. 22, 2024

(54) APPARATUS FOR TREATING OPTICAL FIBERS

(71) Applicant: Waldemar Manko, Bad Lauchstädt (DE)

(72) Inventor: Waldemar Manko, Bad Lauchstädt (DE)

( * ) Notice: Subject to any disclaimer, the term of this patent is extended or adjusted under 35 U.S.C. 154(b) by 361 days.

(21) Appl. No.: 17/630,539

(22) PCT Filed: Jul. 15, 2020

(86) PCT No.: PCT/DE2020/000157
§ 371 (c)(1),
(2) Date: Jan. 27, 2022

(87) PCT Pub. No.: WO2021/018328
PCT Pub. Date: Feb. 4, 2021

(65) Prior Publication Data
US 2022/0258211 A1  Aug. 18, 2022

(30) Foreign Application Priority Data

Aug. 1, 2019 (DE) .................. 10 2019 005 399.0
Aug. 2, 2019 (DE) .................. 20 2019 003 236.3

(51) Int. Cl.
*B08B 1/00* (2024.01)
*B08B 1/14* (2024.01)
*G02B 6/38* (2006.01)

(52) U.S. Cl.
CPC ............ *B08B 1/143* (2024.01); *G02B 6/3866* (2013.01); *B08B 2240/02* (2013.01)

(58) Field of Classification Search
CPC .... B08B 1/143; B08B 2240/02; G02B 6/3866
See application file for complete search history.

(56) References Cited

U.S. PATENT DOCUMENTS 5,735,013 A * 4/1998 Yaguchi ............... G02B 6/3807
15/210.1
6,167,584 B1 * 1/2001 Nassiri ..................... B25B 7/02
15/210.1

(Continued)

FOREIGN PATENT DOCUMENTS

CN 112304853 A * 2/2021 ............. A47K 10/48
DE 2629208 A1 1/1978

(Continued)

*Primary Examiner* — Marc Carlson
(74) *Attorney, Agent, or Firm* — Smartpat PLC

(57) ABSTRACT

An apparatus for treating optical fibers can be used to carry out necessary cleaning work on the end tips of the glass fibers of fiber-optic cables. The apparatus has modules which are provided with non-abrasive surface layers able to pick up contaminants and are spring-mounted in relation to one another such that they can be pivoted about a hinge joint, and, in the case of at least one of the modules, elastic material layers are introduced between the surface layer and the main body of the assembly. The assemblies are preferably designed in the form of grip plates, between which non-abrasive, cloth-like layers are applied, as a cleaning surface, to each of the facing surfaces and, in the case of both gripping plates, elastic insulating materials are arranged between the cloth-like surface layer and the gripping plate.

12 Claims, 4 Drawing Sheets

(56) References Cited

U.S. PATENT DOCUMENTS

| | | | | |
|---|---|---|---|---|
| 6,560,811 B1 * | 5/2003 | Krause | .................... | B08B 11/00 15/210.1 |
| 2003/0123836 A1 * | 7/2003 | Fujisawa | .............. | G02B 6/2556 385/137 |
| 2004/0088813 A1 * | 5/2004 | Cox | .......................... | B08B 1/00 15/210.1 |
| 2006/0263028 A1 * | 11/2006 | Honma | .................... | G02B 6/25 385/134 |
| 2019/0060967 A1 * | 2/2019 | Fairbanks | ............... | B08B 1/143 |
| 2024/0074572 A1 * | 3/2024 | Jung | ....................... | C11D 1/008 |
| 2024/0076582 A1 * | 3/2024 | Mui | ..................... | C11D 17/049 |

FOREIGN PATENT DOCUMENTS

| | | | | |
|---|---|---|---|---|
| DE | 287125 | 2/1991 | | |
| DE | 19842122 C2 | 3/2002 | | |
| DE | 102009044925 | 10/2013 | | |
| WO | 9113837 A1 | 9/1991 | | |
| WO | WO-0153867 A1 * | 7/2001 | ............. | B08B 11/00 |
| WO | WO-2005017590 A1 * | 2/2005 | ............. | B08B 11/00 |

\* cited by examiner

APPARATUS FOR TREATING OPTICAL FIBERS

TECHNICAL FIELD

The invention relates to an apparatus for treating optical fibers, by means of which apparatus in particular the necessary cleaning work can be performed at the fiber end tips of the glass fibers of fiber-optic cables.

BACKGROUND

Until now, cleaning work of optical fibers was performed manually with use of conventional tools. The work involved a risk of injury to the worker, and the fiber ends of the optical fibers were often damaged.

To carry out work on optical fiber cables, tools that are intended to be handled in a manner similar to tongs are described in DE 198 42 122 C2 and can be used to carry out the work more easily and with high quality. To this end, the tongs used as a tool are designed such that the cutting and insulation-stripping elements rule out any damage to glass fibers. A disadvantage of this solution is the absence of the possibility to use the tool as a cleaning apparatus for fiber end tips of glass fibers.

A tool is also known according to DE 26 29 208 for radially cutting into the insulation sleeve of an optical fiber in order to be able to remove it from the optical fiber after having cut into the latter. Here, the focus is on reducing the risk of the optical fiber breaking. With this tool there is also the possibility to use it to clean the fiber end tips.

Furthermore, DD 287 125 A5 discloses a stripping tool for optical fiber fibers for damage-free removal of the primary protective sheathing of optical fiber fibers. This tool created a tool which can be produced with minimal manufacturing outlay and which, in respect of its design, can be used very robustly and with little wear. A disadvantage of this tool, however, is likewise the limited possibility for use for stripping optical fibers without causing damage.

With the hand tool and hand tool set also known by DE 10 2009 044 925 B4, a solution is presented which serves to remove a layer of a conductor end, in particular a protective, outer, insulating or shielding jacket. The objective of the hand tool having a simple structure and a compact design is to allow simple actuation by the user, in particular using only one hand. Here, the conductor can also be formed as an optical fiber and can have any cross-sectional contour. A use for the treatment, in particular cleaning, of the end tips of optical fibers, however, is not possible with this tool.

SUMMARY

The present disclosure provides a tool for treating the end tips of glass fibers or optical fibers. With the tool the end tips can be treated carefully and precisely during a working process without posing any risk of injury to the worker. Previously, the end tips of glass fibers or optical fibers were treated manually with use of conventional tools. This work was accompanied by a risk of injury to the workers and by frequent damage to the fiber ends.

By means of the created cleaning apparatus for fiber end tips, in particular for fiber end tips of glass fibers, the contact points of the glass fibers can be cleaned with a lower risk of injury to the worker. The cleaning apparatus also prevents damage to the fiber ends during the cleaning, requires less time to perform the cleaning work, and requires a lower amount of material to produce such apparatuses. Furthermore, the apparatus can be produced by machine in series production.

The apparatus comprises modules which are provided with non-abrasive surface layers able to pick up contaminations. The modules are for this purpose arranged pivotably about a hinge joint and are spring-mounted relative to one another by means of a spring element introduced in the hinge joint. In at least one of the modules, elastic material layers are arranged between the surface layer and the main body of the module. The apparatus has proven to be advantageous for an economically efficient design in that the modules are formed as grip plates, between which non-abrasive cloth-like layers serving as cleaning surfaces are mounted on each of the facing surfaces and elastic insulating materials are arranged at both grip plates between the cloth-like surface layer and the grip plate. Advantageously for achieving a secure grip, the apparatus is designed such that the grip plates have an ergonomically shaped surface structure, serving to provide grip, on the outwardly directed surfaces. The use of elastic material layers made of rubber materials, which are applied adhesively to a holding plate and connect the holding plate releasably to the main body of the module, has proven to be useful for preventing damage to the fiber end tips during treatment of the latter. The spring effect of the pivotable modules is achieved efficiently in that at least one spring element connected to both modules is arranged in the hinge joint. The non-abrasive surface layers provided as cleaning surfaces are preferably connected to the modules for simple replacement of said surfaces. It is advantageous for an opening-free design of the apparatus if the overall total thickness, formed of the used individual thicknesses of the cloth-like surface layers arranged between the grip plates and the used material thicknesses of the elastic insulation materials, is always the same. In order to achieve, technically efficiently, problem-free functioning of the rotary mechanism for the pivoting movement, the hinge joint consists of an outer and an inner hinge joint, which are joined together and connected by means of a screw connection. The connection is designed such that the hinge joint is mounted rotatably about the longitudinal axis of the screw connection. A predefined maximum clamping width of the hinge joint is advantageously achieved if the screw connection is covered by a screw cover, by means of which the clamping width of the hinge joint is designed to be adjustable by rotation about the longitudinal axis of the screw connection. The surface layers used for the treatment can be exchanged effectively by way of a clamped connection, with which the surface layers are releasably connected to the pivotable modules by means of a clamping bracket. The clamping brackets can also be non-releasably connected to one side each of the modules, but formed rotatably movably at the connection points.

By means of the apparatus, the fiber ends during the cleaning process are physically surrounded over their entire circumference by the used materials. It is also possible to use the apparatus within working spaces that have poor accessibility.

The invention will be explained in greater detail hereinafter on the basis of an exemplary embodiment.

DETAILED DESCRIPTION

Figure 1:
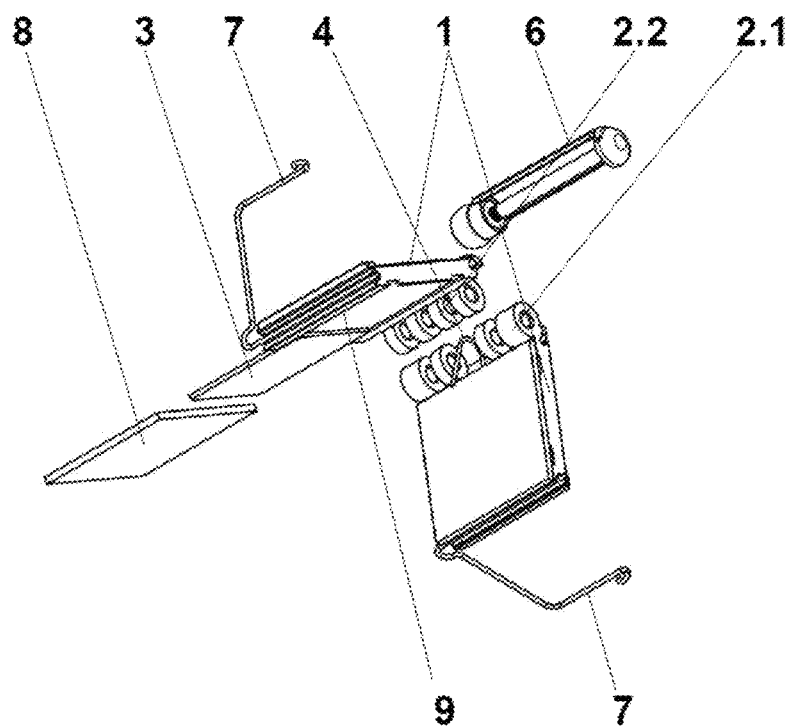
FIG. 1 shows an exploded view of the apparatus.

The exploded view shown in FIG. 1 shows a possible embodiment of the apparatus. Shown are the two pivotable base plates 1, which are connected to one another pivotably by means of a hinge joint. The hinge joint consists of an outer hinge joint 2.1 and an inner hinge joint 2.2, the individual segments of which are joined together in a comb-like fashion. The hinge joint is rotatably fixed by a screw connection 5, which is introduced through the inner cylindrical cavity of the hinge joint. Due to the stable formation of the individual segments of the hinge joint, an impairment of the pivoting movement is prevented. An excessively high torque when tightening the screw connection 5 is therefore unable to have an influence on the rotary movement of the hinge joint. A spring element 4 is arranged in the middle of the hinge joint, by means of which spring element a sprung pivoting movement of the grip plates 1 relative to one another is made possible. The hinge joint is covered by a screw cover 6, the setting of which defines the maximum clamping width of the hinge. Guide rails are arranged laterally on the surfaces of the grip plates 1, into which guide rails the holding plates 3 are slid. Insulating materials 8 are applied adhesively on the surfaces of the holding plates 3 facing the interior of the apparatus. The cleaning cloth used for cleaning the fiber ends of the optical fibers is clamped by means of a clamping bracket 7 inserted on the front side of the apparatus.

Figure 2:
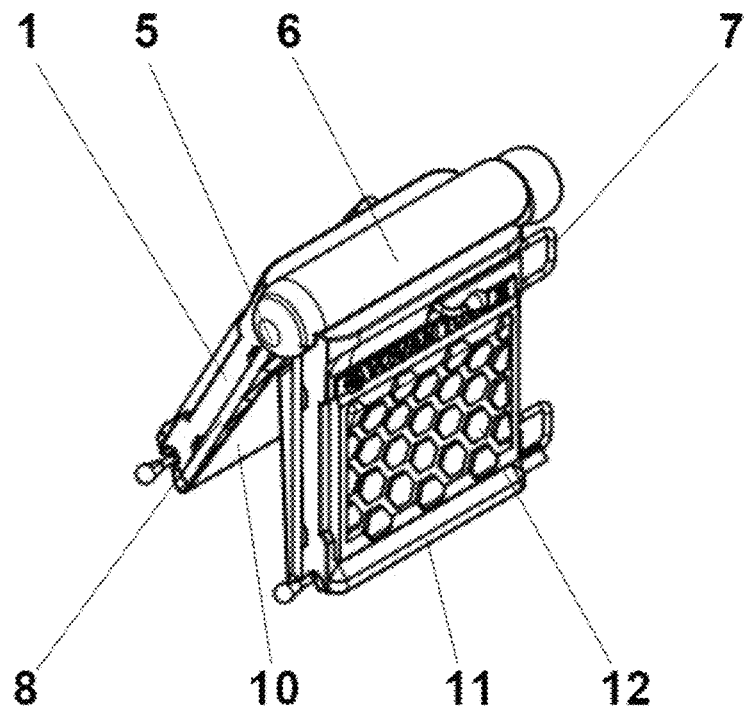
FIG. 2 shows a schematic perspective view of the apparatus in the open state.

FIG. 2 shows schematically a perspective view of the apparatus in the open state. An ergonomically adapted structure is mounted on the surface of the visible grip plate 1 and increases the grip when touching the grip face 12 by hand. The cleaning cloth 10 serving by way of example as treatment surface is arranged in the clamped state by means of the fixed clamping brackets 7. The protrusions 11 mounted on the front ends of the apparatus serve to protect the skin of the user against the materials of the fiber ends.

Figure 3:
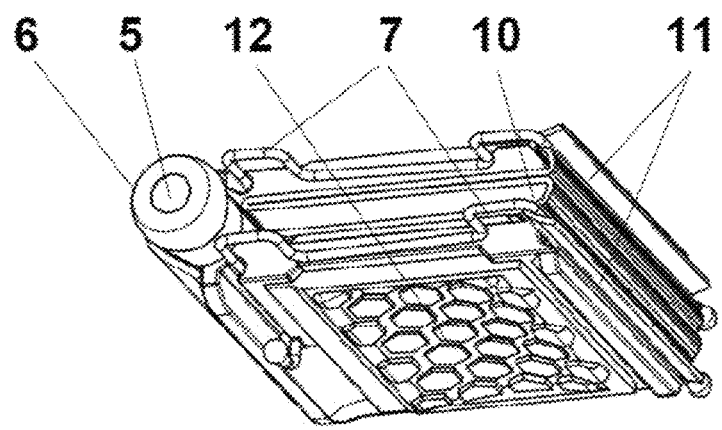
FIG. 3 shows a schematic perspective view of the apparatus in the closed state.

The illustration of FIG. 3 is shown schematically in the closed state. This illustration shows the clamping brackets 7, which are latched in each case in a groove and by means of which the folded cleaning cloth 10 is clamped. The fiber ends, to be treated, of the optical fiber are moved during the cleaning process between the layers of the cleaning cloth 10 arranged within the apparatus.

Figure 4:
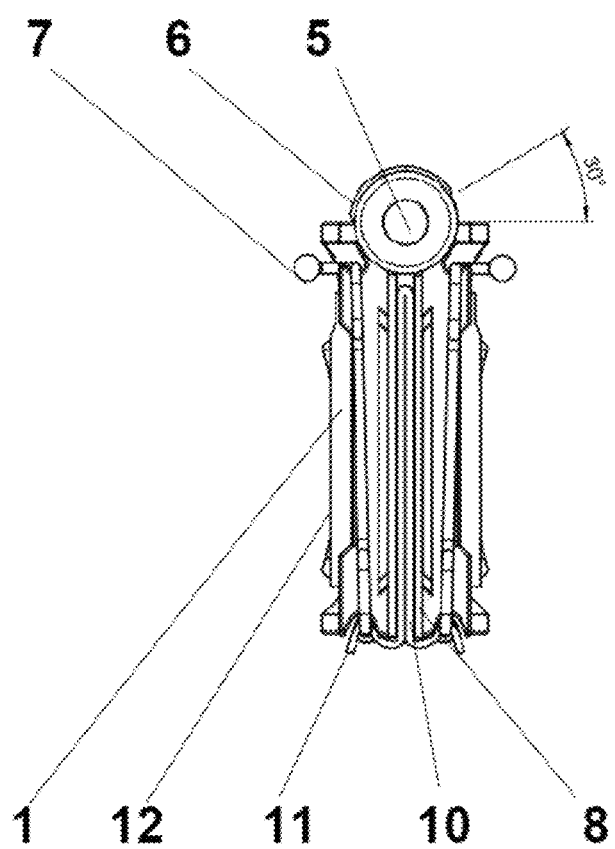
FIG. 4 shows a schematic side view of the apparatus in the closed state.

Based on the illustration of the apparatus from the side in the closed state shown in FIG. 4, the screw cover 6 is visible with a preferred clamping width of 30°. The maximum opening or pivoting movement of the grip plates 1 is limited here to 30°. Also visible are the insulating materials 8 arranged between the grip plates 1 and the cleaning cloth 10 on both sides. The insulating materials 8 consisting of rubber materials and formed as insulation plates are used variably in respect of their material thickness. It is thus possible to compensate for the various thicknesses of the different used cleaning cloths 10.

Figure 5:
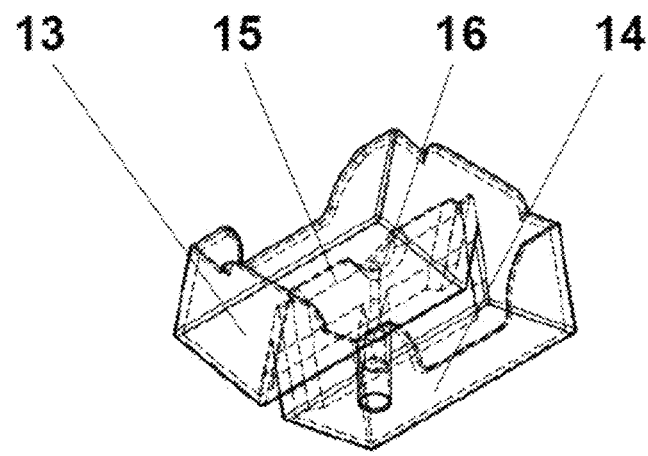
FIG. 5 shows a perspective view of the adapter apparatus serving to feed treatment auxiliary agents.

Due to the cleaning agents also used in addition to others, such as alcohol and isopropanol, it is necessary during the treatment to supply further auxiliary agents as necessary to keep the surfaces wet. For this purpose, an adapter has been created as an accessory module, the design of which for example is shown in a perspective view in FIG. 5. This adapter module is divided into a left collection container 13 and a right collection container 14. The central rib 15 separating the collection containers 13, 14 is designed to receive the closed treatment apparatus with a form fit, in a manner inclined towards the base on both sides. An injection nozzle 16 is formed in the middle of the central rib 15, by means of which nozzle the wetting auxiliary agent to be applied is sprayed onto the surfaces of the grip plates 1. The injection nozzle 16 is formed conically, tapering upwardly, in order to achieve a uniform distribution of the auxiliary agent over the surfaces.

Figure 6:
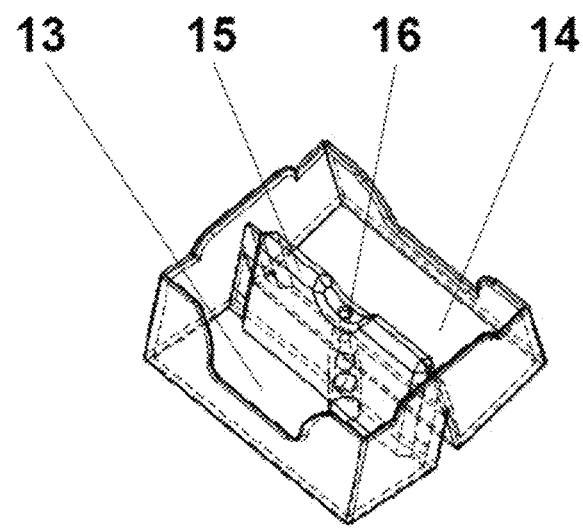
FIG. 6 shows the perspective view of the interior of the adapter apparatus.

The illustration of FIG. 6 again shows a perspective view into the schematically depicted interior of the adapter. To supply the auxiliary agent, the feed module of the container containing the auxiliary agent is inserted into the lower opening of the injection nozzle 16. The treatment apparatus, the container containing the auxiliary agent, and the adapter are preferably sold together as a tool set.

LIST OF REFERENCE SIGNS 1 grip plate
2 hinge joint
2.1 outer hinge joint
2.2 inner hinge joint
3 holding plate
4 spring element
5 screw connection
6 screw cover
7 clamping bracket
8 insulating material
9 guide rail
10 cleaning cloth
11 protrusion
12 grip face
13 left collection container
14 right collection container
15 central rib
16 injection nozzle

The invention claimed is:

1. A tool set, comprising:
   an apparatus for cleaning fiber ends of optical fibers, comprising:
      modules which are provided with non-abrasive surface layers able to pick up contaminants, the modules being mounted pivotably about a hinge joint and spring-mounted relative to one another, and
      elastic material layers arranged between the non-abrasive surface layers and main bodies of the modules; and
   an adapter module, comprising
      a left adapter portion,
      a right adapter portion,
      a central rib separating the left adapter portion from the right adapter portion, and
      an injection nozzle formed in a middle of the central rib,
   wherein the adapter module is configured to receive the apparatus with a form fit.

2. The tool set according to claim 1,
   wherein the modules are formed as two grip plates having facing surfaces between which the non-abrasive surface layers serving as a cleaning surface are applied to each of the facing surfaces, and wherein one of the elastic material layers is arranged between one of the non-abrasive surface layers and each of the two grip plates.

3. The tool set according to claim 2,
wherein the two grip plates, on outwardly directed surfaces, have an ergonomically shaped surface structure serving to provide grip.

4. The tool set according to claim 2,
wherein an overall total thickness, formed of individual thicknesses of the non-abrasive surface layers arranged between the grip plates and a material thicknesses of the elastic material layers is fixed.

5. The tool set according to claim 1,
wherein the elastic material layers consist of rubber materials which are applied adhesively to a holding plate, and
wherein the holding plate is releasably connected to the main body of the at least one of the modules.

6. The tool set-according to claim 1,
wherein at least one spring element connected to the modules is arranged in the hinge joint.

7. The tool set according to claim 1,
wherein the non-abrasive surface layers provided as cleaning surfaces are releasably connected to the modules.

8. The tool set according to claim 1,
wherein the hinge joint consists of an outer and an inner hinge joint, which are joined together and are connected by a screw connection and are mounted rotatably about a longitudinal axis of the screw connection.

9. The tool set according to claim 8,
wherein the screw connection is covered by a screw cover by which a clamping width of the hinge joint is adjustable by rotation about the longitudinal axis of the screw connection.

10. The tool set according to claim 1,
wherein each of the non-abrasive surface layers is releasably connected to one of the modules by a respective clamping connection comprising a respective clamping bracket.

11. The tool set according to claim 1,
wherein the left adapter portion is a left collection container, and
wherein the right adapter portion is a right collection container.

12. The tool set according to claim 1,
wherein the non-abrasive surface layers comprise a cleaning cloth.

\* \* \* \* \*